(12) United States Patent
Ohno et al.

(10) Patent No.: US 10,723,309 B2
(45) Date of Patent: Jul. 28, 2020

(54) VEHICLE SEAT BELT DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Makoto Matsuzaki, Konan (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/220,469

(22) Filed: Dec. 14, 2018

(65) Prior Publication Data

US 2019/0225185 A1 Jul. 25, 2019

(30) Foreign Application Priority Data

Jan. 23, 2018 (JP) .................................. 2018-008981

(51) Int. Cl.
*B60R 22/20* (2006.01)
*B60R 22/26* (2006.01)
*B60N 2/68* (2006.01)
*B60N 2/07* (2006.01)
*B60N 2/42* (2006.01)
*B60N 2/427* (2006.01)
(Continued)

(52) U.S. Cl.
CPC ............ *B60R 22/20* (2013.01); *B60N 2/0705* (2013.01); *B60N 2/0732* (2013.01); *B60N 2/4221* (2013.01); *B60N 2/4263* (2013.01); *B60N 2/42781* (2013.01); *B60N 2/688* (2013.01); *B60R 22/1953* (2013.01); *B60R 22/26* (2013.01); *B60R 2022/1806* (2013.01)

(58) Field of Classification Search
CPC . B60R 22/26; B60R 2022/1806; B60R 22/20; B60R 2022/1818
See application file for complete search history.

(56) References Cited

U.S. PATENT DOCUMENTS 3,899,042 A * 8/1975 Bonar ..................... B60R 21/02
297/487
4,225,184 A * 9/1980 Strowick ................. B60R 22/26
248/393
(Continued)

FOREIGN PATENT DOCUMENTS

JP 2001-122076 A 5/2001
JP 2004-161037 A 6/2004
(Continued)

*Primary Examiner* — Shin H Kim
(74) *Attorney, Agent, or Firm* — Oliff PLC

(57) ABSTRACT

A vehicle seat belt device includes: an anchor part configured to be provided at a vehicle seat or a vehicle body on a first side in a width direction of the vehicle seat, and to displace a lower end portion of a buckle device to a vehicle front side by being deformed by a load applied from a lap belt to the buckle device at a time of vehicle collision; and a buckle rotation mechanism configured to include a guide part that is provided at the vehicle seat or body on a vehicle downward side of the buckle device and inclined downward toward the vehicle front side, and a pull-in part that connects the guide part and an upper portion of the buckle device and is slidable along the guide part, and to rotate the buckle device to the vehicle front side and downward side due to the displacement.

7 Claims, 6 Drawing Sheets

(51) Int. Cl.
  *B60R 22/195* (2006.01)
  *B60R 22/18* (2006.01)

(56) References Cited

U.S. PATENT DOCUMENTS

| | | | | |
|---|---|---|---|---|
| 4,913,497 | A * | 4/1990 | Knabel | B60R 22/1958 |
| | | | | 297/480 |
| 5,261,696 | A * | 11/1993 | Hamaue | B60R 22/03 |
| | | | | 280/802 |
| 6,533,351 | B2 * | 3/2003 | Deptolla | B60N 2/4221 |
| | | | | 297/216.1 |
| 7,658,443 | B2 * | 2/2010 | Musale | B60N 2/1615 |
| | | | | 297/216.1 |
| 8,109,568 | B2 * | 2/2012 | Masutani | B60N 2/4221 |
| | | | | 297/216.1 |
| 8,864,172 | B2 * | 10/2014 | Yilma | B60R 22/20 |
| | | | | 180/268 |
| 9,283,926 | B2 * | 3/2016 | Thomas | B60N 2/16 |
| 9,718,386 | B2 * | 8/2017 | Hayashi | B60R 22/26 |
| 9,783,155 | B2 * | 10/2017 | Kondo | B60N 2/79 |
| 9,914,370 | B2 * | 3/2018 | Kuno | B60N 2/045 |
| 2002/0011746 | A1 * | 1/2002 | Muhlberger | B60N 2/1615 |
| | | | | 297/344.12 |
| 2002/0043872 | A1 * | 4/2002 | Townsend | B60R 22/03 |
| | | | | 297/473 |
| 2005/0134099 | A1 * | 6/2005 | Masutani | B60N 2/0732 |
| | | | | 297/216.1 |
| 2006/0061176 | A1 * | 3/2006 | Sakai | B60N 2/1615 |
| | | | | 297/344.15 |
| 2007/0126277 | A1 * | 6/2007 | Musale | B60N 2/1615 |
| | | | | 297/464 |
| 2007/0257480 | A1 * | 11/2007 | Van Druff | B60R 22/30 |
| | | | | 280/801.2 |
| 2008/0258527 | A1 * | 10/2008 | Gower | B60N 2/2812 |
| | | | | 297/256.15 |
| 2009/0284067 | A1 * | 11/2009 | Kling | B60R 22/20 |
| | | | | 297/473 |
| 2011/0198910 | A1 * | 8/2011 | Masutani | B60R 22/1952 |
| | | | | 297/480 |
| 2015/0136919 | A1 * | 5/2015 | Kim | B60R 22/22 |
| | | | | 248/201 |
| 2019/0176749 | A1 * | 6/2019 | Jaradi | B60R 22/1954 |

FOREIGN PATENT DOCUMENTS

| | | |
|---|---|---|
| JP | 2005-193846 A | 7/2005 |
| JP | 2016-124325 A | 7/2016 |
| JP | 2017181926 A | 10/2017 |

* cited by examiner

VEHICLE SEAT BELT DEVICE

CROSS-REFERENCE TO RELATED APPLICATION

This application is based on and claims priority under 35 USC 119 from Japanese Patent Application No. 2018-008981 filed on Jan. 23, 2018, the disclosure of which is incorporated by reference herein.

BACKGROUND

Technical Field

The present disclosure relates to a vehicle seat belt device.

Related Art

An occupant restraint device described in Japanese Patent Application Laid-Open (JP-A) No. 2005-193846 includes a waist belt (lap belt) that restrains a waist part of an occupant who sits on a vehicle seat, and a pull-down mechanism that pulls down a buckle, to which an end part of the lap belt is connected, in a downward direction at the time of collision of the vehicle. The pull-down mechanism rotates (tilts) the buckle in a direction to the front of the vehicle to pull down the end part of the lap belt from a normal position in a downward direction. In this manner, an angle of the lap belt is actively displaced in a direction which is effective to prevent a submarine phenomenon.

In the prior art described above, the buckle needs to be rotated (tilted forward) as early as possible before a forward movement of an occupant caused by collision of a vehicle is completed. For this reason, an explosive (pyrotechnic) inflator is preferably used as a drive source of the pull-down mechanism. However, an explosive inflator includes a complicated mechanism for holding gas, and also requires an expensive gas forming agent and management cost for an explosive. For this reason, there has been room for improvement in view of reduction in cost.

SUMMARY

The present disclosure is made in consideration of the above fact, and an object of the present disclosure is to obtain a vehicle seat belt device that can restrict generation of a submarine phenomenon at low cost.

A vehicle seat belt device in a first aspect of the present disclosure includes a buckle device, a lap belt, an anchor part, and a buckle rotation mechanism. The buckle device is disposed on a first side in a width direction of a vehicle seat. The lap belt has a first end portion locked in the vehicle seat or a vehicle body on a second side in the width direction of the vehicle seat, and to restrain a waist part of an occupant who sits on the vehicle seat when a tongue attached to a second end portion is connected to an upper end portion of the buckle device. The anchor part is provided at the vehicle seat or the vehicle body on the first side in the width direction of the vehicle seat, and to displace a lower end portion of the buckle device, which is connected to the anchor part so as to be rotatable around an axis line along a vehicle width direction, to a vehicle front side by being deformed by a load applied from the lap belt to the buckle device at a time of collision of a vehicle. The buckle rotation mechanism includes a guide part that is provided at the vehicle seat or the vehicle body on a vehicle downward side of the buckle device and inclined downward toward the vehicle front side, and a pull-in part that connects the guide part and an upper portion of the buckle device and is slidable along the guide part, and to rotate the buckle device to the vehicle front side and the vehicle downward side due to the displacement.

In the first aspect, a lower end portion of the buckle device arranged on the first side in the width direction of the vehicle seat is connected to an anchor part provided on the vehicle seat or the vehicle body in a manner rotatable around an axis line along a vehicle width direction. In this manner, the buckle device is rotatable in a vehicle front-rear direction around the lower end portion. The tongue attached to the second end portion of the lap belt is connected to the upper end portion of the buckle device. The lap belt has the first end portion locked in the vehicle seat or the vehicle body on the second side in the width direction of the vehicle seat, and restrains a waist part of an occupant who sits on the vehicle seat as the tongue is connected to the upper end portion of the buckle device. The first aspect also includes the buckle rotation mechanism having a guide part and a pull-in part. The guide part is provided on a vehicle seat or a vehicle body on a vehicle downward side of the buckle device, and has a downward inclination toward the vehicle front side. The pull-in part connects the guide part and an upper portion of the buckle device, and is slidable along the guide part.

At the time of collision of a vehicle, a load is applied to the buckle device from the lap belt that restrains a waist part of an occupant. At this time, the buckle device is supported by the anchor part, and is also supported by the guide part with the pull-in part provided between the buckle device and the guide part. The anchor part is deformed by the above load, and the lower end portion of the buckle device is displaced to the vehicle front side. By this displacement, a balance of force between the buckle device and the anchor part and the guide part (pull-in part) is changed, and the pull-in part slides to the vehicle front side and the vehicle downward side along the guide part. In this manner, the buckle device having the upper portion connected to the pull-in part is rotated toward the vehicle front side and the vehicle downward side. As a result, the second end portion of the lap belt connected to the buckle device with the tongue interposed between them is pulled down to the vehicle front side and the vehicle downward side. In this manner, the lap belt is not easily removed from a waist part of an occupant, and generation of a submarine phenomenon can be restricted. Further, since the configuration is such that the buckle device is rotated (tilted forward) by using a load of an occupant at the time of collision of a vehicle, cost can be reduced as compared to a configuration using an explosive (pyrotechnic) inflator.

In the vehicle seat belt device in a second aspect of the present disclosure, the pull-in part in the first aspect includes a slider that is slidable along the guide part, and a wire rope that connects the slider and the upper portion of the buckle device.

In the second aspect, the slider that is slidable along the guide part and an upper portion of the buckle device are connected by the wire rope. In this manner, rotation of the buckle device in the vehicle front-rear direction in a normal state can be permitted by a simple configuration. Accordingly, usability of the buckle device can be ensured in an excellent manner.

In the vehicle seat belt device in a third aspect of the present disclosure, the anchor part in the first aspect is an anchor bracket that is fixed to an upper rail of a slide rail of the vehicle seat or a vehicle body floor section.

In the third aspect, the anchor bracket to which the lower end portion of the buckle device is connected is deformed at the time of collision of a vehicle, and the lower end portion of the buckle device is displaced to the vehicle front side. The anchor bracket is fixed to the upper rail of the slide rail of the vehicle seat, or a vehicle body floor section. Accordingly, an amount of deformation of the anchor bracket at the time of collision of a vehicle can be set by the anchor bracket alone.

In the vehicle seat belt device in a fourth aspect of the present disclosure, the buckle device in the first aspect includes a buckle body to which the tongue is connected, and a buckle stay that has a lower end portion connected to the anchor part so as to be rotatable around the axis line, and an upper end portion connected to the buckle body so as to be rotatable around an axis line along the vehicle width direction.

According to the fourth aspect, the buckle body of the buckle device is rotatably connected to the anchor part with the buckle stay interposed between them. In this manner, a rotating direction of the buckle device is easily stabilized as compared to a configuration where, for example, the buckle body is connected to the anchor part with a member of a seat belt (webbing) material interposed between them. Accordingly, rotation (tilting forward) of the buckle device by the buckle rotation mechanism can be stabilized.

As described above, the vehicle seat belt device according to the present invention can restrict generation of a submarine phenomenon at low cost.

BRIEF DESCRIPTION OF THE DRAWINGS

Exemplary embodiments of the present invention will be described in detail based on the following figures, wherein.

DETAILED DESCRIPTION

A vehicle seat belt device 10 according to an embodiment of the present disclosure will be described based on FIGS. 1 to 6. An arrow FR, an arrow UP, and an arrow OUT described as appropriate in each diagram show a forward direction (traveling direction) of a vehicle, an upward direction of a vehicle, and an outward direction in a vehicle width direction, respectively. Hereinafter, when a description will be made simply by using front and rear directions, left and right directions, and upward and downward directions, these directions show forward and backward directions of a vehicle, left and right lateral directions of a vehicle (vehicle width direction), and upward and downward vertical directions of a vehicle unless otherwise specifically noted. In the diagrams, part of numerical signs may be omitted for easier understanding of the diagrams.

(Configuration)

Figure 1:
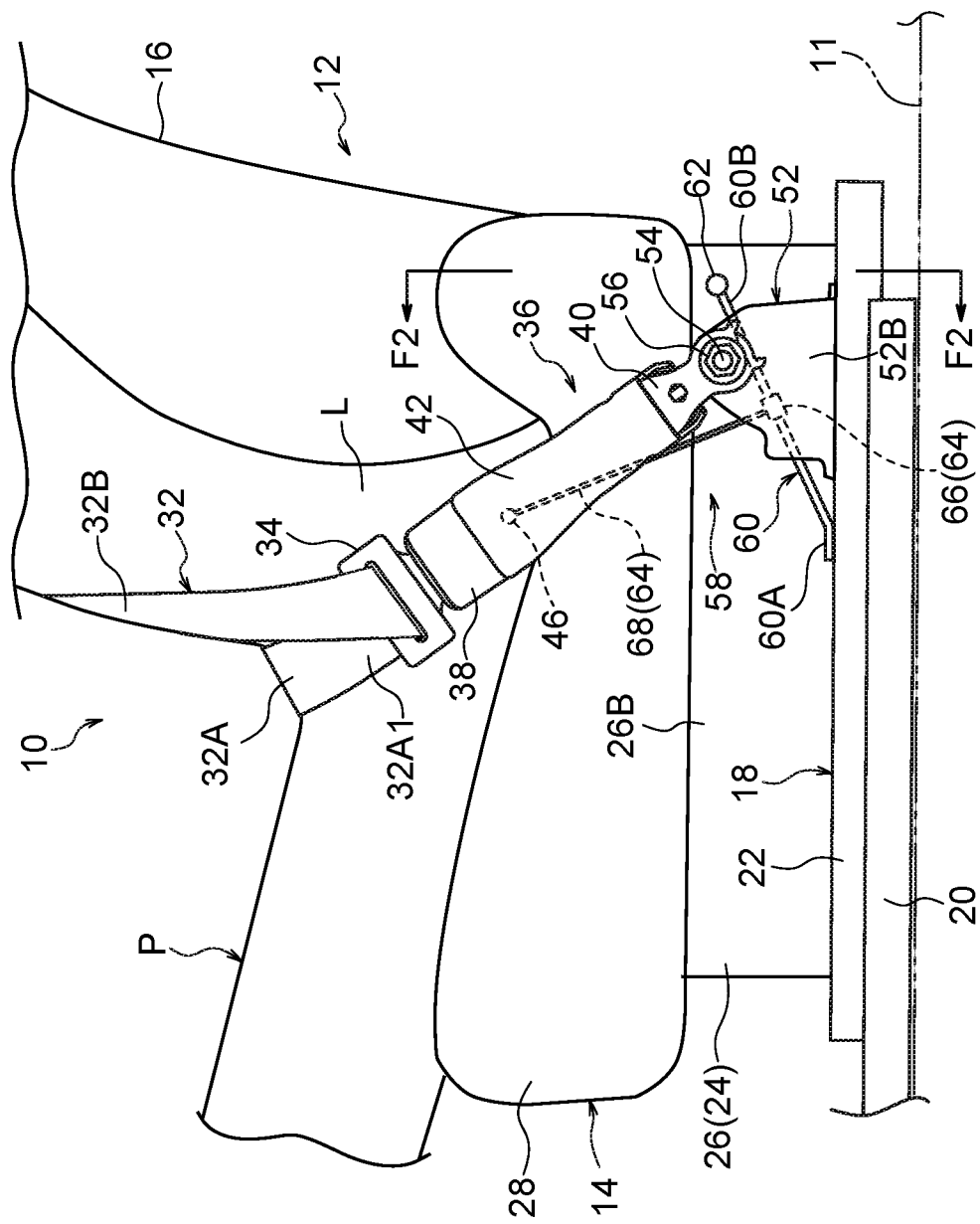
FIG. 1 is a side view showing a state in which a vehicle seat belt device according to an embodiment of the present disclosure is mounted on a vehicle and an occupant wears a webbing.

As shown in FIG. 1, the vehicle seat belt device 10 according to the present embodiment is a three-point seat belt device that restrains an occupant P who sits on a vehicle seat 12. The vehicle seat 12 is, for example, a driver's seat of a vehicle, and is disposed on the right in a front section of a vehicle interior. The vehicle seat 12 includes a seat cushion 14 on which the occupant P sits, a seat back 16 tiltably supported by a rear end portion of the seat cushion 14, and a headrest (not shown) supported by an upper end portion of the seat back 16 in a manner that a height can be adjusted. Front and rear, left and right, and upward and downward directions of the vehicle seat 12 match with front and rear, left and right, and upward and downward directions of the vehicle. When the vehicle seat 12 is disposed on the left in the front section of a vehicle interior, a configuration that is symmetrical with the configuration of the present embodiment is employed.

A pair of left and right slide rails 18 (of which the slide rail 18 on the right is not shown) that adjust a position in a front-rear direction of the vehicle seat 12 are arranged below the seat cushion 14. Each of the left and right slide rails 18 includes a lower rail 20 (not shown in diagrams other than FIGS. 1 and 2) fixed to a vehicle body floor section 11 with a bracket (not shown) interposed between the lower rail 20 and the vehicle body floor section 11, and an upper rail 22 supported by the lower rail 20 in a slidable manner in a front-rear direction of the vehicle. The lower rail 20 and the upper rail 22 are formed in a long body having a longer side in the vehicle front-rear direction.

Figure 2:
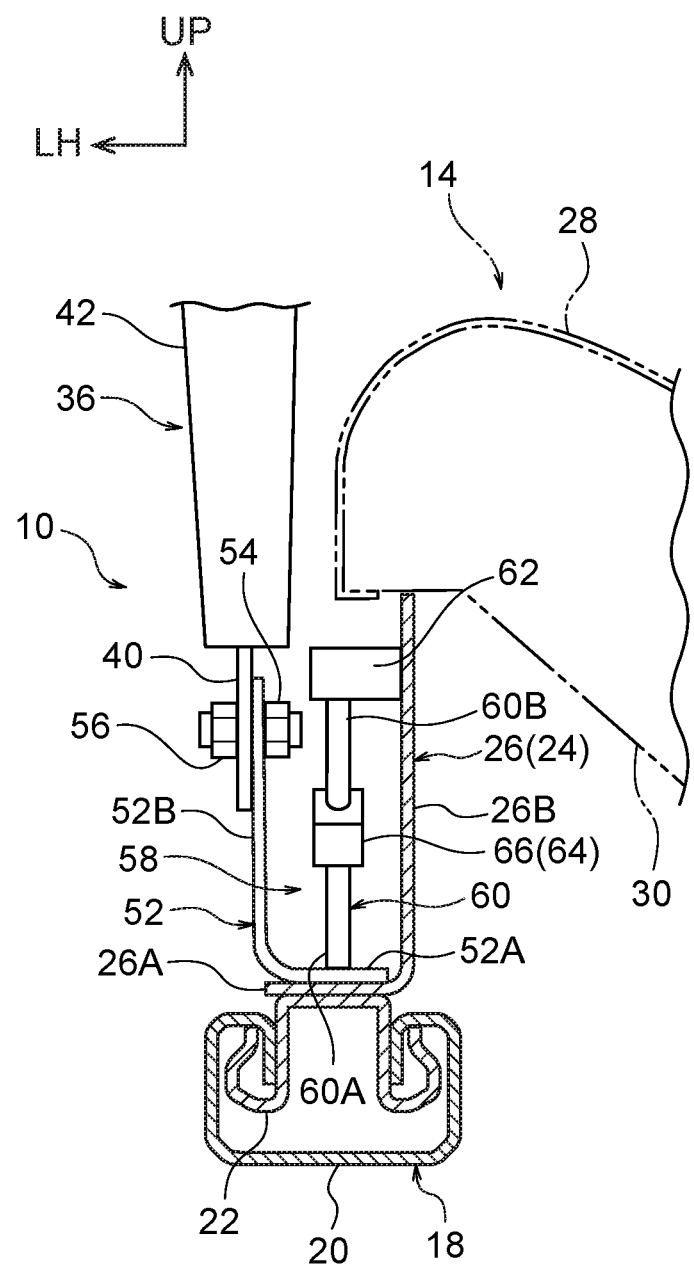
FIG. 2 is an enlarged cross-sectional view showing a cross-section cut along an F2-F2 line of FIG. 1 in an enlarged manner.

Left and right risers 26 included in a cushion frame 24 that is a frame member of the seat cushion 14 are fixed to top surfaces of the left and right upper rails 22. Other than FIGS. 1 and 2, illustration of the risers 26 is omitted, and illustration of the riser 26 on the right is omitted in FIGS. 1 and 2. The left and right risers 26 are formed by, for example, pressing a steel plate, and have an L-shaped cross-section when viewed from a vehicle front-rear direction. Specifically, as shown in FIG. 2, the riser 26 includes a fixed wall 26A fixed to a top surface of the upper rail 22 by a means, such as fastening with a bolt, and a vertical wall 26B that extends upward from an inner end portion in a seat width direction of the fixed wall 26A. The cushion frame 24 configured by including the risers 26 is attached with a cushion pad 30 covered with a cover 28.

As shown in FIG. 1, the vehicle seat belt device 10 applied to the vehicle seat 12 described above includes a webbing 32 (illustration of which is omitted in diagrams other than FIG. 1) for restraining an occupant, a buckle device 36 disposed on a first side (on the left in this example) in a width direction of the vehicle seat 12, an anchor bracket 52 disposed in a vehicle downward side of the buckle device 36, and a buckle rotation mechanism (buckle forward tilting mechanism) 58 that rotates (tilts forward) the buckle device 36 to a vehicle front side at the time of collision of a vehicle.

A first end portion (not shown) of the webbing 32 is locked on an anchor plate (not shown) fixed to the vehicle body floor section 11 on a second side (on the right in this example) in the width direction of the vehicle seat 12. A second end portion (not shown) of the webbing 32 is locked on a winding shaft of a webbing winding device (not shown) provided on a lower section or the like of a center pillar. A middle portion of the webbing 32 is inserted through and folded at a shoulder anchor (not shown) provided in an upper section or the like of the center pillar. A tongue (tongue plate) 34 is inserted through a portion of the webbing 32 between the shoulder anchor and the anchor plate. The tongue 34 corresponds to the buckle device 36. In diagrams other than FIG. 1, illustration of the tongue 34 is omitted.

As shown in FIGS. 1 and 2, the buckle device 36 is disposed on the first side in the width direction of the vehicle seat 12 and on a side (on the left in this example) in a rear part side of the seat cushion 14. As shown in FIGS. 1 to 6, the buckle device 36 includes a buckle body (buckle main body) 38 to which the tongue 34 is connected (locked), a buckle stay (connection part) 40 that extends from the buckle body 38 to a vehicle rear side and a vehicle downward side, and a tubular boot 42 that covers the buckle stay 40.

The buckle body 38 is formed in a substantially rectangular block, and provided in an upper portion of the buckle device 36. A holding mechanism that holds the tongue 34 and a releasing mechanism that releases holding of the tongue 34 by the holding mechanism are provided in the inside of the buckle body 38. In the buckle body 38, a connection piece 38A (refer to FIGS. 4 and 5) formed of, for example, a steel plate, extends from an end portion (lower end portion) on an opposite side of a side to which the tongue 34 is connected. The connection piece 38A corresponds to the buckle stay 40.

The buckle stay 40 is formed of, for example, a steel plate, in a long plate shape. A first end portion (upper end portion) of the buckle stay 40 is placed on the connection piece 38A from an outer side (left side in this example) in the seat width direction. The upper end portion of the buckle stay 40 and the connection piece 38A are connected in a relatively rotatable manner by a connection pin (connection shaft) 46 that passes through both of them. The connection pin 46 has a cylindrical shape along a vehicle width direction in an axial line direction. The buckle body 38 is rotatable around an axial line along the vehicle width direction with respect to the buckle stay 40. The connection pin 46 is, for example, a caulking pin. Enlarged diameter portions 46A and 46B in which a diameter of the connection pin 46 is enlarged are provided on both end portions in an axial direction of the connection pin 46. This configuration prevents removal of the connection pin 46 from the connection piece 38A and the buckle stay 40.

Figure 3:
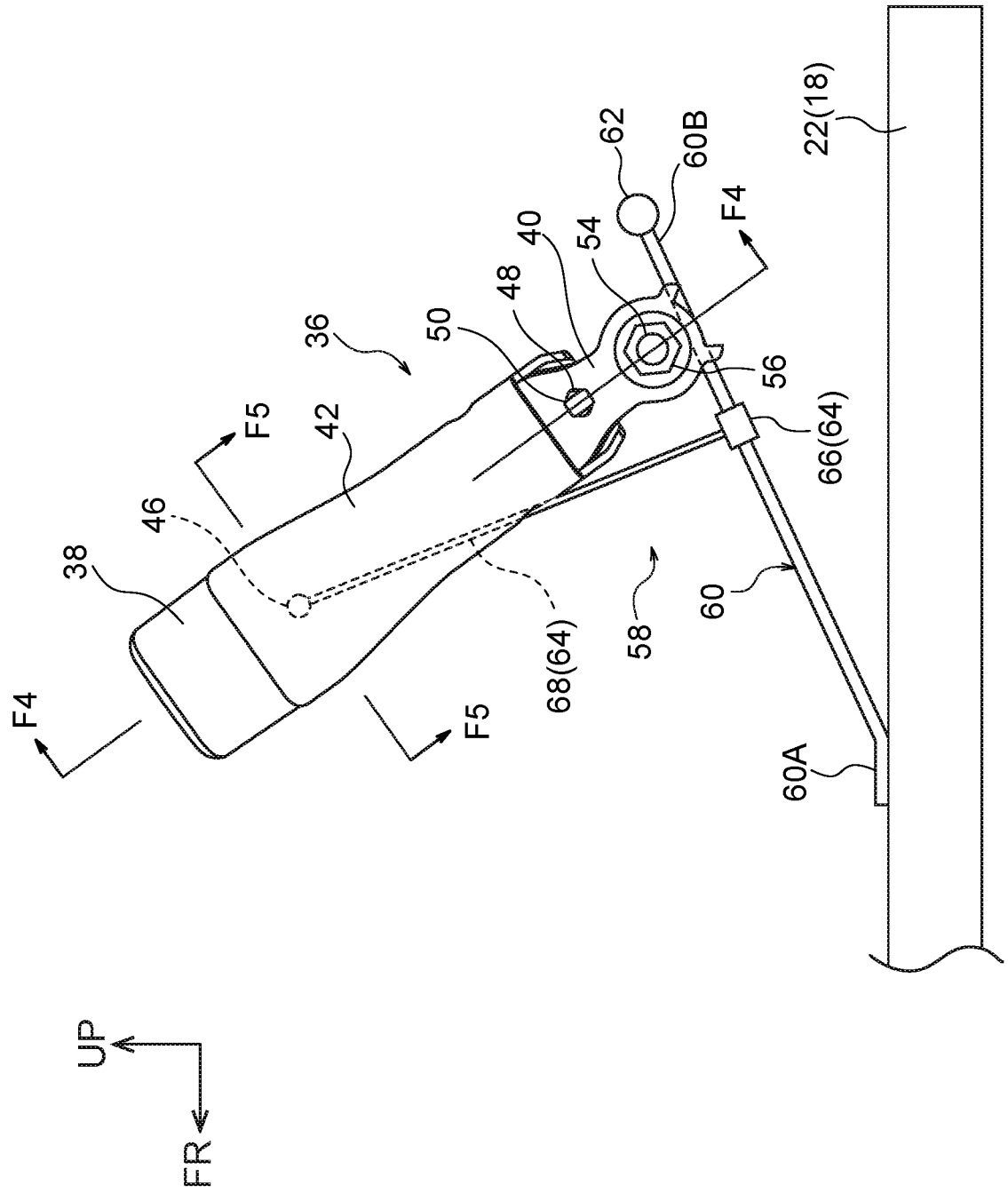
FIG. 3 is a side view showing a part of the configuration shown in FIG. 1 in an enlarged manner.

The buckle stay 40 described above is inserted on an inner side of the boot 42. The boot 42 is formed of, for example, soft resin or rubber (soft resin in this case), in a substantially long square tube shape. A first end side (lower end side) of the buckle body 38 is fitted to a first end portion (upper end portion) of the boot 42. As shown in FIG. 3, a second end portion of the boot 42 is provided with a locking protrusion 50 (whose numerical sign is omitted in diagrams other than FIG. 3) that is fitted to and locked by a locking hole 48 (whose numerical sign is omitted in diagrams other than FIG. 3) formed on a second end side of the buckle stay 40. The second end portion of the buckle stay 40 extends from a lower end portion of the boot 42 to an outer side (the vehicle rear side and the vehicle downward side) of the boot 42, and is connected to the anchor bracket 52.

The anchor bracket 52 (not shown in diagrams other than FIGS. 1 and 2) is formed by, for example, pressing a steel plate, and has an L-shaped cross-section when viewed from the vehicle front-rear direction. Specifically, the anchor bracket 52 includes a fixed wall 52A (refer to FIG. 2) that is placed on a top surface of a rear portion of the fixed wall 26A of the riser 26 and fixed to the fixed wall 26A and the upper rail 22 by a means, such as fastening with a bolt, and a vertical wall 52B that extends upward from an outer end portion in a seat width direction of the fixed wall 52A. The vertical wall 52B faces the vertical wall 26B of the riser 26 from an outer side in the seat width direction (from the left in this example) with a gap interposed between them.

A lower end portion of the buckle stay 40 is placed on an upper end portion of the vertical wall 52B from an outer side of the seat width direction. The upper end portion of the vertical wall 52B and the lower end portion of the buckle stay 40 are connected in a relatively rotatable manner by a shoulder bolt 54 passing through both of them and a nut 56 into which the shoulder bolt 54 is screwed. An axial line direction of the shoulder bolt 54 is along a vehicle width direction. The buckle device 36 is rotatable around an axial line along the vehicle width direction with respect to the anchor bracket 52. A guide bar (guide rail) 60 as a guide part that is a constituent of the buckle rotation mechanism 58 is disposed between the vertical wall 52B of the anchor bracket 52 and the vertical wall 26B of the riser 26.

The guide bar 60 is formed, for example, of metal in a long rod shape, and is disposed in an attitude in a downward inclination toward the vehicle front side. A front end side of the guide bar 60 extends to the vehicle front side further than the anchor bracket 52. A front end portion 60A of the guide bar 60 in this case is curved along a top surface of the upper rail 22, and fixed to the upper rail 22 by a means, such as welding. A rear end portion 60B of the guide bar 60 is disposed in the vicinity of a rear end portion of the anchor bracket 52, and is fixed to a rear end portion of the vertical wall 26B of the riser 26 by a fixing member 62 made from metal and the like. The fixing member 62 described above is fixed to the vertical wall 26B by a means, such as welding or fastening with a bolt, and the rear end portion of the guide bar 60 is fixed to the fixing member 62 by a means, such as welding. A slider 66, which is a constituent of the buckle rotation mechanism 58, is attached to the guide bar 60.

The slider 66 is formed, for example, of metal in a block shape. For example, a through-hole (not shown) through which the guide bar 60 is inserted is formed on the slider 66. In this manner, the slider 66 is supported by the guide bar 60 in a slidable manner along a longitudinal direction of the guide bar 60, and a sliding direction of the slider 66 is regulated by the guide bar 60. A wire rope 68, which is a constituent of the buckle rotation mechanism 58, is bridged between the slider 66 and an upper portion of the buckle device 36. In FIG. 2, illustration of the wire rope 68 is omitted.

Figure 4:
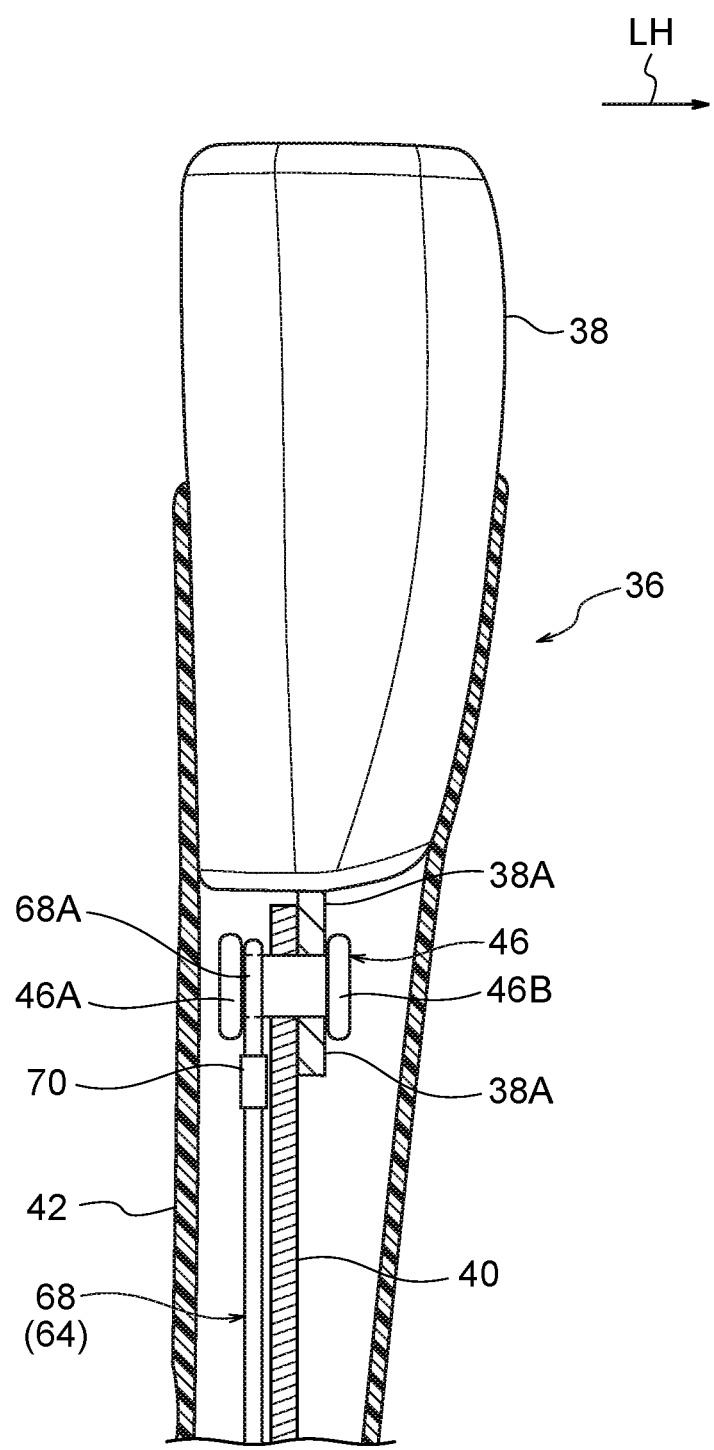
FIG. 4 is an enlarged cross-sectional view showing a cross-section cut along an F4-F4 line of FIG. 3 in an enlarged manner.
Figure 5:
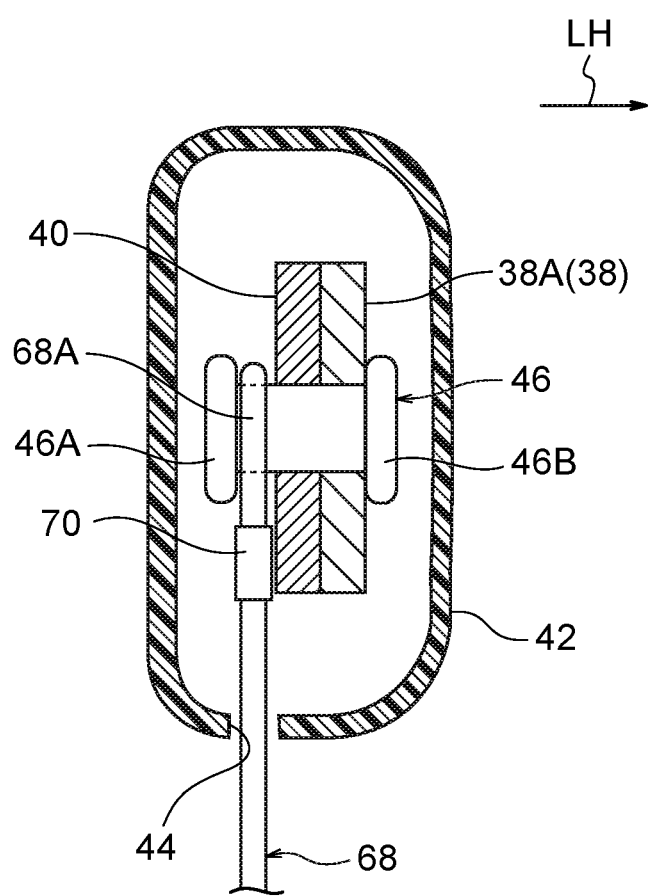
FIG. 5 is an enlarged cross-sectional view showing a cross-section cut along an F5-F5 line of FIG. 3 in an enlarged manner.
Figure 6:
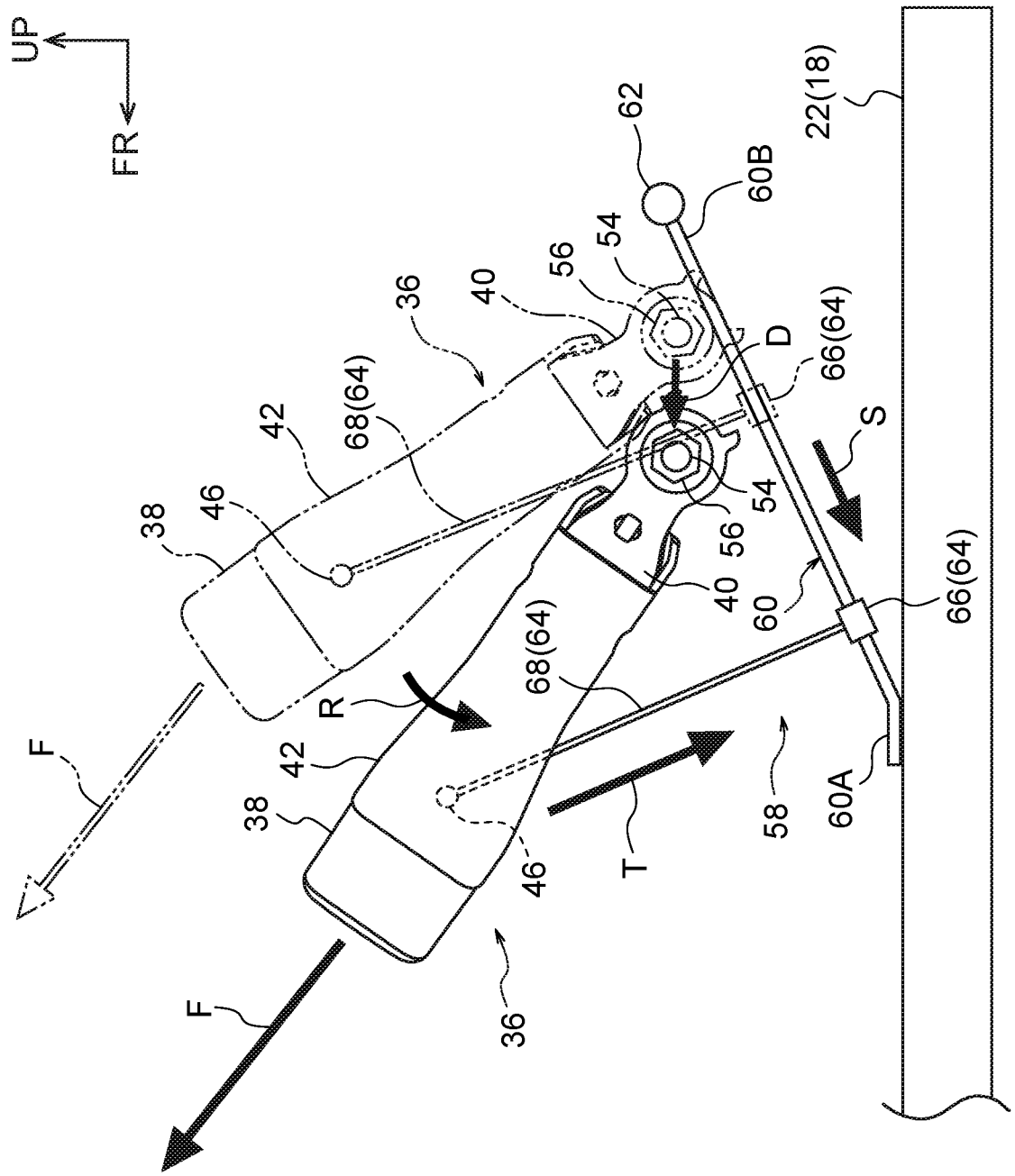
FIG. 6 is a side view corresponding to FIG. 3 showing a situation at the time of collision of a vehicle.

As shown in FIGS. 4 and 5, an eye (ring) 68A is formed on a first end portion (upper end portion) of the wire rope 68. The eye 68A is formed by tightening processing using a sleeve 70 in this case. The connection pin 46 described above is inserted through the eye 68A. The eye 68A is disposed between the enlarged diameter portion 46A of the connection pin 46 described above and the upper end portion of the buckle stay 40, and is prevented from being removed from the connection pin 46 by the enlarged diameter portion 46A. In this manner, a first end portion of the wire rope 68 is rotatably locked around the connection pin 46 with respect to the connection piece 38A of the buckle body 38. An eye (not shown) is formed on a second end portion (lower end portion) of the wire rope 68. The second end portion of the wire rope 68 is locked on the slider 66 by using a male screw member (now shown), such as a bolt, that is inserted through the eye. In this manner, the upper portion of the buckle device 36 and the slider 66 are connected by the wire rope 68. The slider 66 and the wire rope 68 constitute a pull-in part 64.

A locking method of the wire rope 68 on the upper portion of the buckle device 36 and the slider 66 is not limited to the above. For example, a method, such as one that attaches a terminal jig for retention to the upper end portion of the wire rope 68 that passes through the upper end portion of the buckle stay 40, and the lower end portion of the wire rope 68 that passes through the slider 66.

The vehicle seat belt device 10 described above has a configuration, in which the slider 66 is disposed on a vehicle front inclined downward side with respect to the lower end portion of the buckle device 36 (lower end portion of the buckle stay 40) in a normal state. The wire rope 68 bridged between the slider 66 and the connection pin 46 is disposed to extend from the connection pin 46 to the vehicle downward side and somewhat to the vehicle rear side in a normal state. A slit 44 cut from a lower end of the boot 42 to an upper end side of the boot 42 is formed on a wall part on the vehicle front side of the boot 42. A portion of the wire rope 68 on the slider 66 side extends toward an outer side of the boot 42 through the slit 44.

In the vehicle seat belt device 10 having the above configuration, the occupant P who sits on the vehicle seat 12 holds and engages (connects) the tongue 34 with an upper portion of the buckle body 38 (the upper end portion of the buckle device 36), so that the occupant P is in a state of wearing the webbing 32 (state shown in FIG. 1). In this webbing wearing state, a portion of the webbing 32 from the tongue 34 to the anchor plate is a lap belt 32A that restrains a waist part L of the occupant P, and a portion of the webbing 32 from a shoulder anchor to the tongue 34 is a shoulder belt 32B that restrains an upper half of the occupant P. The lap belt 32A has the first end portion (not shown) locked on the vehicle body floor section 11 on the second side in the width direction of the vehicle seat 12, and the tongue 34 attached to a second end portion 32A1 connected to the upper end portion of the buckle device 36, so as to restrain the waist part L of the occupant P who sits on the vehicle seat 12.

The buckle device 36, to which the lap belt 32A is connected by the tongue 34, an excessive load to the vehicle front side and the vehicle upward side (refer to an arrow F of FIG. 6) is applied at the time of collision (front collision) of a vehicle. As a result, the anchor bracket 52 is deformed, and a lower end portion of the buckle device 36 (the lower end portion of the buckle stay 40; a connection part of the buckle device 36 to the anchor bracket 52) is configured to be displaced to the vehicle front side and somewhat to the vehicle upward side. The front collision described above is considered, for example, as the full-wrap head-on collision (against a rigid barrier, speed at 35 mph) specified by National Highway Traffic Safety Administration (NHTSA) of the United States. In the present embodiment, strength of the anchor bracket 52 is set so that the anchor bracket 52 is deformed by an amount set in advance at the time of the full-wrap head-on collision described above.

(Function and Advantage)

Next, a function and an advantage of the present embodiment will be described.

In the vehicle seat belt device 10 having the above configuration, the lower end portion of the buckle device 36 is connected to the anchor bracket 52 so as to be rotatable around an axial line along the vehicle width direction. The vehicle downward side of the buckle device 36 is provided with the guide bar 60 inclined downward toward the vehicle front side and the slider 66 that is slidable along the guide bar 60. The slider 66 and the upper portion of the buckle device 36 are connected by the wire rope 68.

At the time of collision of a vehicle, a load F (refer to FIG. 6) to the vehicle front side and the vehicle upward side is applied to the buckle device 36 by the lap belt 32A that restrains the waist part L of the occupant P. At this time, the buckle device 36 is supported by the anchor bracket 52, and is also supported by the guide bar 60 through the wire rope 68 that is stretched by the load F and the slider 66. The anchor bracket 52 is deformed by the load F, and the lower end portion of the buckle device 36 is displaced to the vehicle front side (refer to an arrow D of FIG. 6). By this displacement, a balance of force between the buckle device 36 and the anchor bracket 52 and the guide bar 60 (the slider 66) is changed, and the slider 66 slides to the vehicle front side and the vehicle downward side along the guide bar 60 (refer to an arrow S of FIG. 6). As a result, the buckle device 36 whose upper portion is connected to the slider 66 by the wire rope 68 is pulled in by the wire rope 68 (refer to an arrow T of FIG. 6), and is rotated to the vehicle front side and the vehicle downward side (refer to an arrow R of FIG. 6). In this manner, the second end portion 32A1 of the lap belt 32A is pulled down so that the lap belt 32A is not easily removed from the waist part L (pelvis) of an occupant, and generation of a submarine phenomenon can be restricted.

Further, since the configuration is such that the buckle device 36 is rotated (tilted forward) by using a load from the occupant P at the time of collision of a vehicle, generation of a submarine phenomenon can be prevented by a simple configuration as compared to a configuration using an explosive (pyrotechnic) inflator, and reduction in cost can be achieved. A submarine phenomenon often occurs when the occupant P moves forward due to an impact of collision of a vehicle. Accordingly, generation of a submarine phenomenon can be effectively restricted by using a load from the occupant P.

Further, in the present embodiment, the slider 66 that is slidable along the guide bar 60 and an upper portion of the buckle device 36 are connected by the wire rope 68 having flexibility. In this manner, rotation of the buckle device 36 in the vehicle front-rear direction around the lower end portion (around the shoulder bolt 54) is permitted in a normal state. Accordingly, usability of the buckle device 36 can be ensured in an excellent manner.

In the present embodiment, the anchor bracket 52 to which the lower end portion of the buckle device 36 is connected is deformed at the time of collision of a vehicle, and the lower end portion of the buckle device 36 is displaced to the vehicle front side. The anchor bracket 52 is fixed to the upper rail 22 of the slide rail 18 of the vehicle seat 12. Accordingly, an amount of deformation of the anchor bracket 52 (that is, an amount of displacement of the lower end portion of the buckle device 36) at the time of collision of a vehicle can be set by the anchor bracket 52 alone. In this manner, setting of the amount of displacement is facilitated.

In the present embodiment, the buckle body 38 of the buckle device 36 is rotatably connected to the anchor bracket 52 with a buckle stay 40 interposed between them. In this manner, a rotating direction of the buckle device 36 is easily stabilized as compared to a configuration where, for example, the buckle body 38 is connected to the anchor bracket 52 with a member of a seat belt (webbing) material interposed between them. Accordingly, rotation (tilting forward) of the buckle device 36 by the buckle rotation mechanism 58 can be stabilized.

The present embodiment employs the configuration where the buckle body 38 and the anchor bracket 52 are connected with the buckle stay 40 interposed between them.

However, the present invention is not limited to this configuration, and the buckle body 38 and the anchor bracket 52 may be connected with a member (inner webbing) of a seat belt material interposed between them. In this case, for example, a first end portion of the inner webbing is locked on the connection piece 38A of the buckle body 38, and an anchor plate (anchor member) on which a second end portion of the inner webbing is locked is connected to the anchor bracket 52 so as to be rotatable around an axis line along the vehicle width direction.

The above embodiment employs the configuration in which the anchor bracket 52 as an anchor part is fixed to the upper rail 22 of the slide rail 18. However, the present invention is not limited to this configuration. For example, when the vehicle seat 12 does not include the slide rail 18, the configuration may be such that the anchor bracket 52 is directly fixed to the vehicle body floor section 11. The configuration may be such that part of the cushion frame 24 is used as an anchor part, that is, for example, a lower end portion of the buckle stay 40 is directly connected to the riser 26 of the cushion frame 24 or the like.

The above embodiment also employs the configuration in which the pull-in part 64 includes the wire rope 68. However, the present invention is not limited to this configuration, and a long rod-like member, such as a wire, or a link mechanism may be used in place of the wire rope 68.

When a link mechanism is used as described above, for example, a first end portion in a longitudinal direction of a first link member formed in a long body and a first end portion in a longitudinal direction of a second link member formed in a long body are rotatably connected around an axis line along the vehicle width direction. A second end portion in a longitudinal direction of the first link member is connected to the connection piece 38A so as to be rotatable around an axis line along the vehicle width direction, and a second end portion in a longitudinal direction of the second link member is connected to the slider 66 in a fixed manner, or in a manner rotatable around an axis line along the vehicle width direction. The configuration may be such that the second end portion in a longitudinal direction of the second link member is slidable along the guide bar 60, so that the slider 66 is omitted.

The above embodiment employs the configuration in which the front end portion 60A of the guide bar 60 as the guide part is fixed to the upper rail 22, and the rear end portion 60B of the guide bar 60 is fixed to the riser 26 (the cushion frame 24). However, the present invention is not limited to this configuration. For example, the configuration may be such that the rear end portion 60B of the guide bar 60 is fixed to a fixing member fixed to a rear end portion of the upper rail 22. The configuration may also be such that, for example, both the front end portion 60A and the rear end portion 60B of the guide bar 60 are fixed to the cushion frame 24. The configuration may also be such that, for example, a long hole (guide hole) formed on the riser 26 is used as a guide part, and the slider 66 slides along the guide hole.

Other than the above, the present disclosure can be performed after a variety of changes are made within a range not deviating from the gist thereof. As a matter of course, the scope of right of the present disclosure is not limited to the above embodiment.

What is claimed is:

1. A vehicle seat belt device, comprising:
   a buckle device configured to be disposed on a first side in a width direction of a vehicle seat;
   a lap belt configured to have a first end portion locked at the vehicle seat or a vehicle body on a second side in the width direction of the vehicle seat, and to restrain a waist part of an occupant who sits on the vehicle seat when a tongue attached to a second end portion is connected to an upper end portion of the buckle device;
   an anchor part configured to be provided at the vehicle seat or the vehicle body on the first side in the width direction of the vehicle seat, and to displace a lower end portion of the buckle device, which is connected to the anchor part so as to be rotatable around an axis line along a vehicle width direction, to a vehicle front side by being deformed by a load applied from the lap belt to the buckle device at a time of collision of a vehicle; and
   a buckle rotation mechanism configured to include a guide part that is provided at the vehicle seat or the vehicle body on a vehicle downward side of the buckle device and inclined downward toward the vehicle front side, and a pull-in part that connects the guide part and an upper portion of the buckle device and is slidable along the guide part, and to rotate the buckle device to the vehicle front side and the vehicle downward side due to the displacement.

2. The vehicle seat belt device according to claim 1, wherein the pull-in part comprises:
   a slider configured to be slidable along the guide part; and
   a wire rope configured to connect the slider and the upper portion of the buckle device.

3. The vehicle seat belt device according to claim 1, wherein
   the anchor part is an anchor bracket fixed to an upper rail of a slide rail of the vehicle seat or a vehicle body floor section.

4. The vehicle seat belt device according to claim 1, wherein the buckle device comprises:
   a buckle body to which the tongue is connected; and
   a buckle stay configured to have a lower end portion connected to the anchor part so as to be rotatable around the axis line, and an upper end portion connected to the buckle body so as to be rotatable around an axis line along the vehicle width direction.

5. The vehicle seat belt device according to claim 4, wherein
   a connection piece extending from a lower end portion of the buckle body and an upper end portion of the buckle stay are connected so as to be relatively rotatable by a connection shaft, and
   an upper end portion of the pull-in part is locked at the connection piece so as to be rotatable around the connection shaft.

6. The vehicle seat belt device according to claim 4, wherein
   the buckle device comprises a tubular boot covering the buckle stay.

7. The vehicle seat belt device according to claim 1, wherein
   the guide part is a guide bar formed in a long rod shape.

* * * * *